June 12, 1934.
W. E. BLYTHE
Re. 19,205
HEAT TREATING FURNACE
Original Filed Feb. 21, 1930
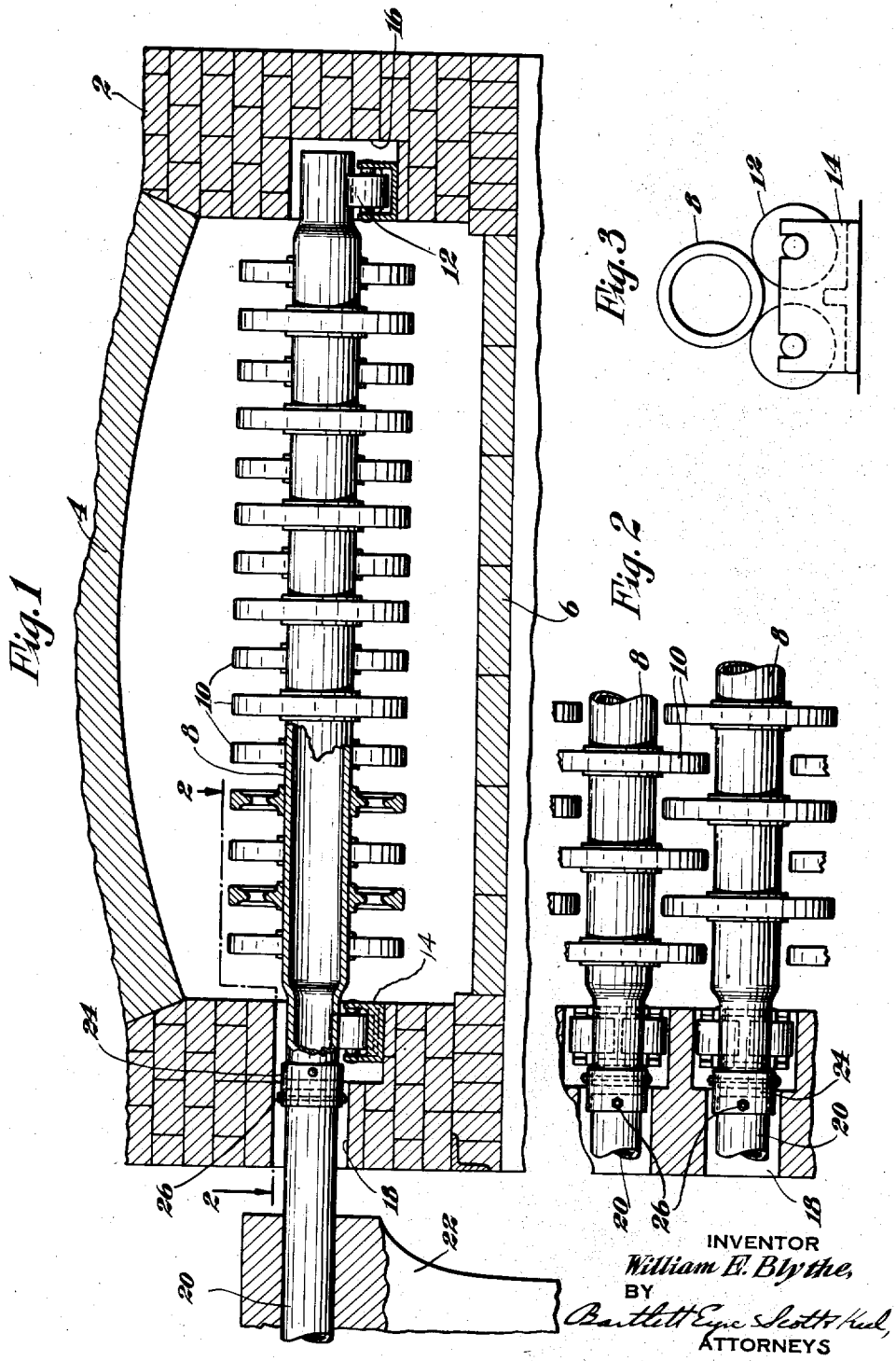
INVENTOR
William E. Blythe,
BY
Bartlett Eyre Scott & Kud,
ATTORNEYS Reissued June 12, 1934 Re. 19,205

UNITED STATES PATENT OFFICE 19,205

HEAT TREATING FURNACE

William E. Blythe, Birmingham, Mich., assignor to Driver-Harris Company, Harrison, N. J., a corporation of New Jersey Original No. 1,843,440, dated February 2, 1932, Serial No. 430,193, February 21, 1930. Application for reissue January 23, 1934, Serial No. 707,996

6 Claims. (Cl. 263—6)

My invention relates to high temperature heat-treating furnaces of the type in which the material to be treated is conveyed through the furnace on rolls, each roll usually consisting of a shaft carrying wheels or disks with the disks of the several rolls arranged in staggered relation.

One of the objects of my invention is to provide a furnace of the character indicated in which the conveyor rolls are capable of withstanding the intense heat of the furnace without resorting to the use of water or other cooling agent, and in which the shafts of the rolls may be made of small diameter so as to permit the rolls to be positioned with their axes in close proximity.

Another object of the invention is to provide a novel and improved conveyor roll for a high temperature heat-treating furnace of the character indicated.

The several features of the invention whereby the above-mentioned and other objects may be attained, will be readily understood from the following description and accompanying drawing, in which:

Figure 1 is a transverse sectional view, partly in elevation, of a portion of a furnace embodying the features of my invention in their preferred form;

Fig. 2 is a detail sectional plan view taken substantially on the line 2—2 of Fig. 1;

Fig. 3 is a detail end view of the shaft of one of the rolls and its supporting bearing.

The furnace illustrated in the drawing is provided with a furnace chamber having side walls 2, a top wall 4, and a bottom wall 6, and conveyor rolls extending transversely of the furnace chamber, each roll comprising a shaft 8 and material conveying disks 10 secured thereon. The disks 10 of the several rolls are arranged in staggered relation so as to permit each disk to extend into the spaces between adjacent disks of adjacent rolls with the periphery of the disk positioned in close proximity to the shafts of the adjacent rolls.

In accordance with my invention, the ends of the shafts are supported on roller bearings 12 that are mounted in cradles 14 set into or secured in recesses 16 in the inner sides of the side walls of the furnace chamber, the ends of each shaft extending only a slight distance beyond the outer sides of the roller bearings. One side wall of the furnace chamber is closed. The other side wall is provided with cylindrical openings 18 in substantial alinement with the roll shafts 8. Each conveyor roll is driven by a drive shaft 20 that may be mounted in a suitable bearing on a supporting bracket 22 on the outside of the furnace. Each shaft 20 is arranged in axial alinement with the shaft of the associated conveyor roll and is connected with the roll shaft by a suitable flexible coupling 24. As shown, this coupling consists of a collar or sleeve which is telescoped over the adjacent ends of the associated drive shaft and roll shaft and is loosely connected therewith by bolts 26 arranged transversely of each other, and extended through apertures in the coupling sleeve and the ends of the shafts. The conveyor roll shafts may be made hollow, and said shafts, couplings, conveyor disks and roller bearings may be made of a suitable heat-resisting alloy.

With this construction, it will be apparent that the shafts of the conveyor rolls are of minimum length and thus are capable of much more effectively withstanding the intense heat of the furnace and the weight of the material without sagging at their centers than is the case with rolls in which their shafts extend through apertures in the side walls and are supported in bearings outside of the furnace chamber as heretofore has been customary. Heretofore, it has been attempted to increase the strength of the shafts of conveyor rolls by increasing their diameters, but this has not proven satisfactory for the reason that it is necessary for the shafts to be of as small diameter as possible in order to permit them to be positioned with their axes close together so as to allow the disks of the rolls to engage the material at closely spaced points.

The conveyor rolls are mounted in such a manner as to allow for expansion and contraction, and close fitting of parts is unnecessary.

Owing to the small size and weight of my improved conveyor rolls they are relatively cheap to manufacture, and require less power to operate.

As will be evident to those skilled in the art, my invention permits various modifications without departing from the spirit thereof or the scope of the appended claims.

What I claim is:

1. In a heat-treating furnace of the class described, the combination of a furnace chamber having side walls, conveyor rolls extending between the side walls, bearings for the ends of said rolls mounted adjacent the inner sides of the side walls, one of the side walls having an opening in alinement with each roll, and means for driving said roll comprising a drive shaft, a bearing for the drive shaft arranged outside of the furnace, and coupling means connecting one end of each roll with its drive shaft through the opening associated with the roll, said conveyor rolls and the bearings therefor being located entirely within the furnace chamber.

2. In a heat-treating furnace of the class described, the combination of a furnace chamber having side walls, a conveyor roll extending between the side walls, bearings for the ends of said roll set into said side walls one of said side walls having an opening in alinement with said roll, a drive shaft for the roll, and a flexible coupling connecting one end of the drive shaft with one end of the roll, said end of the drive shaft extending into said opening, and the ends of said roll being spaced inwardly from the outer sides of said side walls, said conveyor rolls and the bearings therefor being located entirely within the furnace chamber.

3. In a heat-treating furnace of the class described, the combination of a furnace chamber having side walls, conveyor rolls extending between and located wholly within the side walls, each roll comprising a hollow shaft and disks secured on the shaft in spaced relation with the disks of the several rolls arranged in staggered relation with the periphery of each disk arranged in close proximity to the peripheral surfaces of adjacent shafts, the inner sides of each of the side walls being provided with recesses, roller bearings mounted in said recesses for supporting the ends of the shafts, one of said side walls being closed, and the other side wall having openings in substantial alinement with the shafts of the rolls, a drive shaft for each of the rolls extending into the opening in alinement with the roll, and flexible coupling means connecting the inner ends of said drive shaft and the adjacent ends of the shafts of the rolls.

4. In a heat-treating furnace of the class described, the combination of a furnace chamber, conveyor rolls extending across the furnace chamber, means for supporting the rolls for rotary movement comprising bearing rollers on which the conveyor rolls rest, supports for the bearing rolls, said conveyor rolls, bearing rollers and supports for the bearing rollers being located entirely within the furnace chamber, and means independent of the bearing rollers for rotating the several conveyor rolls, the bearing rollers being freely rotatable by engagement with the rotating conveyor rolls.

5. In a heat-treating furnace, a furnace chamber having side walls, conveyor rolls extending across the furnace chamber with at least one end of each roll spaced a distance inwardly from the outer side of the adjacent side wall, bearings for each of the rolls spaced a distance inwardly from the outer sides of the side walls, driving means for each of the conveyor rolls located outside of the furnace chamber, and means for flexibly coupling each of the rolls to its driving means.

6. In a heat-treating furnace of the class described, a furnace chamber having side walls, conveyor rolls extending across the furnace chamber with at least one end of each of the rolls spaced a distance inwardly from the outer side of the adjacent side wall, bearings for supporting each of the rolls spaced inwardly from the outer sides of said side walls, each bearing comprising bearing rollers upon which the conveyor roll rests, a driving shaft for each of the rolls, means located outside of the furnace chamber for supporting said driving shaft, and flexible coupling means connecting said driving shaft with its conveyor roll.

WILLIAM E. BLYTHE.